Jan. 8, 1935.  B. A. BROWN  1,987,178
BEARING
Filed Jan. 18, 1932

Inventor
Bernard A. Brown
By Spencer Hardman & Fehr
his Attorneys

Patented Jan. 8, 1935

1,987,178

UNITED STATES PATENT OFFICE 1,987,178

BEARING

Bernard A. Brown, Dayton, Ohio, assignor, by mesne assignments, to General Motors Corporation, Detroit, Mich., a corporation of Delaware Application January 18, 1932, Serial No. 587,225

3 Claims. (Cl. 308—163)

This invention relates to bearings for taking up or minimizing end play in shafts and more particularly to the shafts for dynamo electric machines. It is one of the objects of the present invention to provide an end play take up or minimizing device which will remain effective without adjustment for a long period and is practically noiseless in operation. In the disclosed embodiment of the present invention this object is accomplished by providing a substantially spherical end surface on one end of the shaft, which end surface opposes a disc of cork or other resilient material that is preferably adjustably mounted; said cork or resilient material being initially lubricated by a supply of lubricant contained in a recess therein, and also continually lubricated, when the shaft is rotating, by lubricant preferably from a well which contains a supply of lubricant for lubricating an end bearing for the shaft; and by providing a comparatively light spring or resilient member for resiliently urging said spherical end surface of the shaft toward the cork or resilient material so that after the shaft has been run for a short period of time, the end of the shaft wears a glazed complementary surface on the cork or resilient material and the force of said spring or resilient member is sufficiently reduced to effect a reduction of the friction loss of the end thrust minimizing means to practically zero.

Further objects and advantages of the present invention will be apparent from the following description, reference being had to the accompanying drawing wherein a preferred embodiment of one form of the present invention is clearly shown.

In the drawing:

Figs. 2, 3 and 4 are drawn to a larger scale than Fig. 1.

Figure 1:
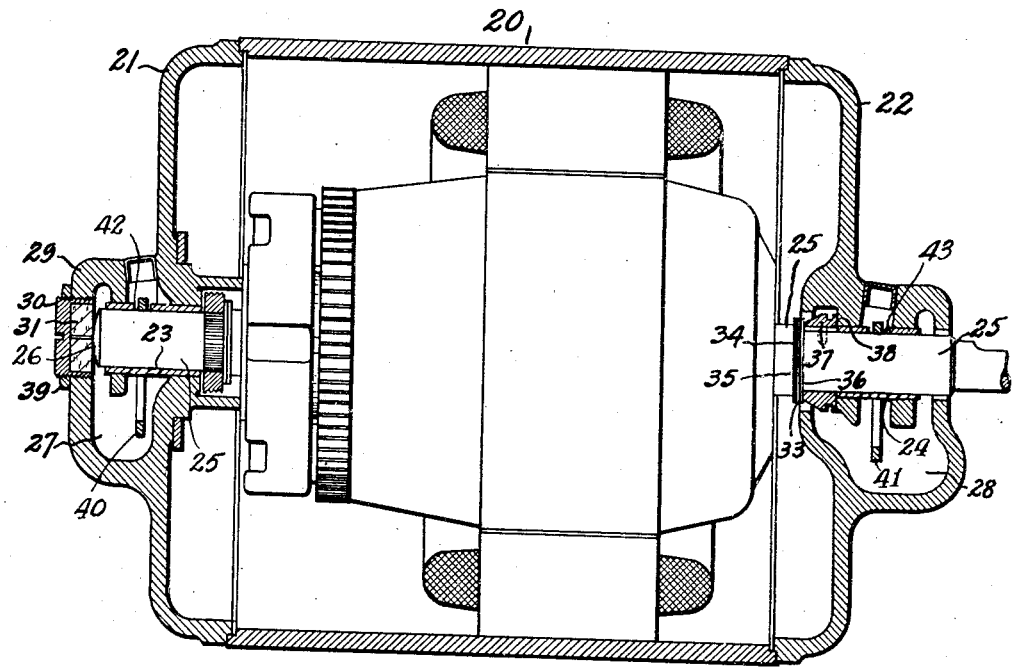
Fig. 1 is a longitudinal sectional view of an electric motor provided with a shaft end play take up embodying the present invention.
Figure 2:
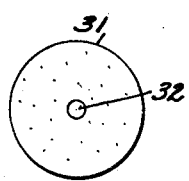
Fig. 2 is a side elevation of the cork disc which bears against the end of the shaft.
Figure 3:
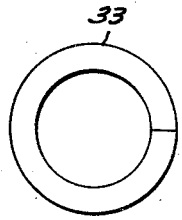
Figs. 3 and 4 are side and edge views respectively of a spring washer used to resiliently urge the shaft against the cork disc.
Figure 4:

Referring to Fig. 1, 20 designates a field frame to which end frames 21 and 22 are attached. End frames 21 and 22 respectively provide bearings 23 and 24 for an armature shaft 25 and wells 27 and 28 respectively for supplying lubricant to these bearings. The lubricant is carried from the wells 27 and 28 by rings 40 and 41 respectively; said bearings 23 and 24 having openings 42 and 43 respectively, therein to permit said rings to ride on the shaft 25. The shaft 25 preferably has a substantially spherical end surface 26. An end wall 29 of the well 27 is provided with a threaded hole in alignment with the shaft 25 for receiving a plug 30 containing a disc of cork or other resilient material which is provided with a small hole 32 in alignment with the end surface 26 of the shaft 25. Before the disc 31 is installed, its hole 32 is filled with grease. The shaft 25 is yieldingly urged toward the disc 31 by a resilient spring split washer 33 shown in Figs. 3 and 4. This washer is located between a plane washer and flat washer 34 bearing against a shoulder 35 provided by the shaft 25, and between a similar flat washer 36 bearing against an oil thrower 37 driven by the shaft 25 and bearing against a shoulder 38 provided by the frame 22.

When the motor is first assembled the plug 30 is screwed into the frame wall 29 so that the cork disc 31 will bear with substantial pressure against the end surface 26 of the shaft 25; then the plug 30 is locked into position by tightening the lock nut 39. The pressure of the disc 31 against the end surface 26 is preferably adjusted to a predetermined value, which value may be determined in a manner such as by measurement of the power input to the motor to determine the friction loss effected by the pressure of the disc on the shaft. This value of pressure is preferably such that after the cork or resilient material is worn by running the shaft for a short interval of time, such as for example forty-eight hours, the substantially spherical end surface 26 of the shaft establishes a complementary glazed seat in the cork or resilient material. When this seat is established, the force of the spring 33 urging the shaft 25 toward the cork is preferably substantially zero, so that the friction loss effected by the spring and the engagement of the shaft and cork is substantially zero. The grease contained within the hole 32 becomes softened due to the heat and flows to lubricate this bearing, particularly while the shaft is being initially run. This grease operates to prevent the charring of the cork disc which would likely occur until after the motor has been operating a substantial period and aids in obtaining a glazed seat for the shaft. Only one filling of the hole 32 with grease is required, since, after the cork disc has adjusted itself to the end of the shaft 25, its bearing with the shaft is provided with lubrication by the lubricant in the reservoir 27. After the bearing surface has been formed by the shaft 25 upon the cork disc, this bearing surface does not wear away appreciably.

Hence, very little adjustment of the plug 30 is required. However, if the cork does wear after a long period of use, the plug 30 may be adjusted to compensate for the wear.

As an example of the original adjustment of the plug 30 on a certain size of motor, the plug is originally set and locked in a position such that the power loss due to the friction is substantially 10 watts. After the motor has run for a comparatively short period, such as forty-eight hours, the friction loss drops to from zero to about one and one half watts. This indicates that the pressure of the shaft against the cork is very light and that a surface having a very low friction coefficient is established. If the shaft tends to move toward the spring, and away from the cork disc, the spring resiliently urges it back toward the cork disc, which disc quietly arrests and cushions the axial movement toward it.

It is therefore apparent in the foregoing description of the invention I have provided a bearing which is effective and durable and which is practically noiseless in operation.

While the form of embodiment of the present invention as herein disclosed, constitutes a preferred form, it is to be understood that other forms might be adopted, all coming within the scope of the claims which follow.

What is claimed is as follows:

1. An endplay take-up device for shafts comprising, in combination, a shaft having a substantially spherical end surface at one end thereof, a cork end thrust bearing having a grease containing recess filled with grease at assembly to initially prevent charring of the cork and engaging said spherical end surface of the shaft, and resilient means for resisting axial movement of the shaft away from the cork bearing.

2. An endplay take-up device for shafts comprising, in combination, a shaft having a substantially spherical end surface, bearings rotatably supporting the shaft, means providing lubricant wells from which lubricant is supplied to the bearings, an end-thrust cushioning bearing made of relatively soft material and having an end thrust cushioning surface worn therein by said spherical end surface, said end thrust cushioning bearing having a grease containing recess therein adapted to be filled with grease before the shaft is run to prevent charring of the end thrust cushioning bearing while it is being worn in, said end thrust cushioning bearing being continuously lubricated with lubricant from the well when the shaft is rotating, and resilient means for resisting axial movement of the shaft away from the end thrust cushioning bearing.

3. An endplay minimizing device for shafts comprising, in combination, a shaft having a bearing surface on the end thereof, bearings rotatably supporting the shaft, means providing lubricant wells from which lubricant is supplied to the bearings, a cork disc end thrust cushioning bearing mounted in axial alignment with said bearing surface on the end of the shaft and adjustable axially relative to the end of the shaft, resilient means biasing the shaft toward the cork disc, said disc being initially adjusted to exert a force against said bearing surface sufficient to distort said resilient means, said disc having a recess therein initially filled with grease to prevent charring of the cork, and said bearing surface wearing a complementary glazed seat in the disc and thereby substantially eliminating the normal distortion of the resilient means.

BERNARD A. BROWN.